United States Patent [19]

Stenzel

[11] Patent Number: 4,527,051
[45] Date of Patent: Jul. 2, 1985

[54] TOKEN SUCH AS CREDIT OR IDENTIFICATION CARD AND AN APPARATUS FOR TESTING THE TOKEN OR CARD

[75] Inventor: Gerhard Stenzel, Munich, Fed. Rep. of Germany

[73] Assignee: Gao Gesellschaft fur Automation und Organisation mbH, Munich, Fed. Rep. of Germany

[21] Appl. No.: 413,650

[22] Filed: Sep. 1, 1982

[30] Foreign Application Priority Data

Jul. 6, 1978 [DE] Fed. Rep. Germany .............. 2829778

[51] Int. Cl.³ .............................................. G06K 5/00
[52] U.S. Cl. ..................................... 235/380; 235/487; 235/493; 340/825.34
[58] Field of Search ............... 235/491, 493, 492, 488, 235/467, 468, 454, 462, 441; 340/825.34; 434/121; 283/57, 91, 92, 83, 89, 904, 113; 250/555, 569

[56] References Cited

U.S. PATENT DOCUMENTS

| 3,105,908 | 10/1963 | Burkhardt | 235/491 |
|---|---|---|---|
| 3,279,826 | 10/1966 | Rudershausen | 235/491 |
| 3,444,517 | 5/1969 | Rabinow | 340/146.3 T |
| 3,468,046 | 9/1969 | Makishima | 40/2.2 |
| 3,502,851 | 3/1970 | Kakimoto | 235/491 |
| 3,763,356 | 10/1973 | Berler | 235/491 |
| 3,790,754 | 2/1974 | Black | 235/493 |
| 3,793,600 | 2/1974 | Grosbard | 235/491 |
| 3,869,082 | 3/1975 | Ludin | 235/492 |
| 3,876,865 | 4/1975 | Bliss | 235/488 |
| 3,919,447 | 11/1975 | Kilmir | 235/491 |
| 3,946,203 | 3/1976 | Hecht | 235/491 |
| 4,013,894 | 3/1977 | Foote et al. | 250/569 |
| 4,034,211 | 7/1977 | Horst et al. | 235/454 |
| 4,041,279 | 8/1977 | Foote | 235/454 |
| 4,075,384 | 2/1978 | Suzuki | 360/131 |
| 4,132,350 | 1/1979 | Kubota | 235/488 |
| 4,135,031 | 1/1979 | Akashi | 360/134 |
| 4,171,868 | 10/1979 | Jung et al. | 350/3.61 |
| 4,230,938 | 10/1980 | Margolin | 235/441 |
| 4,423,415 | 12/1983 | Goldman | 340/825.34 |
| 4,450,348 | 5/1984 | Stockburger et al. | 235/380 |

FOREIGN PATENT DOCUMENTS 2829778 1/1980 Fed. Rep. of Germany .

OTHER PUBLICATIONS

Hoefs and Britt Method of Detecting Document Skew, IBM T.D.B., vol. 7, No. 6, p. 467, Nov. 1964.

Primary Examiner—Gene Z. Rubinson
Assistant Examiner—Robert Lev

[57] ABSTRACT

A security document such as a credit card or the like has material adapted to be optically scanned arranged along a line in the document. A modulating structure such as a document paper thickness is disposed within the document so as to be positioned between the line and an optically scanning, light sensing device. Accordingly, light emitting material in the line of the card upon being scanned will have the light thereof modulated so as to produce a reproducible authenticating variable when said line is scanned by the light sensing device.

8 Claims, 9 Drawing Figures

TOKEN SUCH AS CREDIT OR IDENTIFICATION CARD AND AN APPARATUS FOR TESTING THE TOKEN OR CARD

The invention relates to a token such as a credit or identification card with individual features which are distributed at random over the surface of the card in or on it and can be physically measured.

A great variety of credit card types have been proposed with a view to protecting them against imitation and falsification to as great an extent as possible. A high degree of protection can be achieved when the individual credit card is given a property unique to it, which comes about incidentally during production, for example.

An essential element in the production and testing of credit cards is not only the degree of protection, however, but also the automatic testability of the token with respect to the necessary technical effort and clear reproducibility.

The German Offenlegungsschrift No. 22 45 028, for example, describes an identification card which is to be protected against imitation and falsification by a so-called "safety property". The identification card is given a measurable random property with the help of a magnetic material disposed along a stripe on the card. The stripe is divided into several areas or characters (A and B). The amount of material for each character, its position, dimensions and coercive force are supposed to be measurable variables. The safety property is located at a place on the identification card in which it is not easy to detect. The safety and random property of the identification card as proposed by the German Offenlegungsschrift No. 22 45 028 is determined exclusively by characteristic properties of the magnetic material or the arrangement of the material along a stripe on the card.

The properties of the stripe can in principle be measured with simple methods and can thus also be imitated since the materials necessary to duplicate it are easily obtained. As can also be gathered from German Offenlegungsschrift No. 22 45 028, the safety property itself is not of high value since the stripe is "hidden" in the card. The stripe cannot be effectively disguised, however, without corresponding effort during the production of the card. It is possible in principle to impede the imitation of the safety property itself, for example, by choosing the dimensions of the magnetic areas or their distance from each other within very exacting tolerances. But this greatly increases the technical effort involved in reliable and in particular reproducible testing of the property, which must be possible in a great number of testing devices. When security is increased, one must put up with correspondingly high expenses for the testing equipment. Furthermore, the production of the card is also more elaborate and thus more expensive when its security is increased.

The German Auslegeschrift No. 19 31 536 discloses a credit card which receives a random magnetic pattern not able to be seen by eye on certain parts of its surface due to random distribution of magnetic material.

During the individualization of the card, i.e. when the data specific to the customer are entered, the magnetic pattern is scanned along a fixed measuring track and the resulting electrical signal is stored in a central memory. For testing, the magnetic pattern is then read again along the fixed measuring track and the result is compared with the value stored during individualization. An authenticity signal is generated when the values are identical.

It is easy to understand that testing fails when the magnetic track which was scanned during the individualization of the card is not precisely kept to. Due to the distribution of the magnetic material over the area of the card, deviations in the scanning device perpendicular to the measuring track lead to a different result as compared to the scanning of the original measuring track.

Deviations from the measuring track cannot be avoided when a credit card is used repeatedly since in an extensive credit card system there are a great number of testing devices which basically differ from each other due to production tolerances and since both the credit cards of the system and the testing devices are constantly subject to slight changes due to phenomena of wear and so on. This is even more so when a credit card, as mentioned above, is tested in different testing devices.

In a further publication (German Offenlegungsschrift No. 26 35 795) a solution is proposed to reproduce the scanning of a measuring track better. It involves credit cards whose protection against forgery is to be increased by the presence and testing of randomly distributed magnetic fibers in the paper.

For testing, the card is scanned in a predetermined measuring track by a detector responding to magnetic properties. The output pulses of the detector are assigned to clock pulses thus forming a binary code which is compared with a binary code produced previously in the same manner and stored on the card on a second magnetic track. When the two binary codes are identical, further steps in the operational sequence are cleared.

In order to now ensure that the position of the measuring track is kept to in the testing device, there is a positioning track provided at the edge of the card to help adjust the magnetic head to the track in question before scanning begins. This step, which is paid for with additional technical effort, does allow for the elimination of static deviations resulting from disadjustments of the magnetic head—but it does not allow for the elimination of dynamic deviations due to card transportation tolerances in the testing device, so that measuring errors still come about due to the random distribution of the magnetic fibers over the surface of the card when the scanning head of the testing device is not directed precisely in the track of the first testing.

The problem on which the invention is based is thus to propose a token whose individual random information can only be imitated with great difficulty although testing is simple, and which can be produced with the conventional production methods in a simple manner.

The problem is solved by the features stated in the characterizing part of the main claim.

The invention uses the individualizing properties which are present in an identification card anyway (such as absorbing and/or light dispersing areas in different planes of the card) to produce random information. With the help of the optically scannable line the random properties of the card which are distributed over the surface of the card (such as the structure of the paper, the structure of the film, the structure of overprints, etc.) are reduced to a line which can be scanned with simple means. The simple and reliable reproducible detection of the random property according to measuring technique is thus guaranteed. Combinations of different individualizing random properties of the card are detected according to the arrangement of the optically scannable line on or in the card. The degree of protection against forgery can be controlled in a very simple manner by the selection of different individualizing effects, without affecting the effort involved in testing. If the optically scannable line is produced of fluorescent material, for example, it is possible to include the characteristic properties of this material in the testing process.

In the following, embodiments of the invention shall be described by way of example with reference to the drawing.

Turning now to the drawings and more specially to FIG. 1, a credit card 1 is to be seen which, like a widely used form of check card, takes the form of a paper workpiece or core covered on two sides by transparent facing foils and a signing stripe 2 worked into the top facing foil. The paper core has all information necessary for testing the credit card by eye and marks for making out the card user, as for example the card number, the name and address of the user and the like. The signing stripe 2, on which the card is signed by the user after receipt, is for example given a vignette ornament, and other steps are taken so that any attempt at making changes by rubbing out may be seen. In addition to old and widely used design measures there is furthermore, on the facing foil, a fluorescent line 3 running in the long-direction of the card and whose fluorescence may be in the visible and furthermore in the invisible parts of the spectrum; the only measure important for the invention is that the fluorescence of the line may be clearly made out in the test part of the spectrum from the parts around it.

Figure 1A:
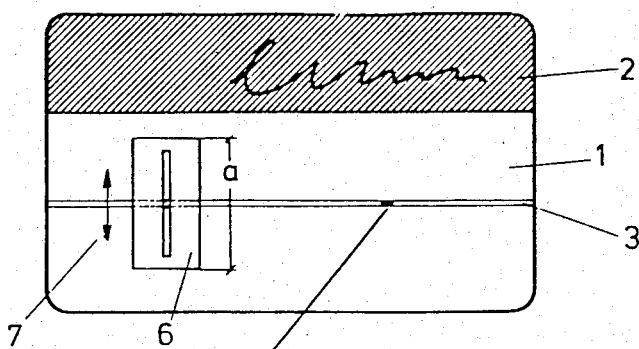
FIG. 1a is a view of a credit card with a fluorescent line in its middle.
Figure 1B:
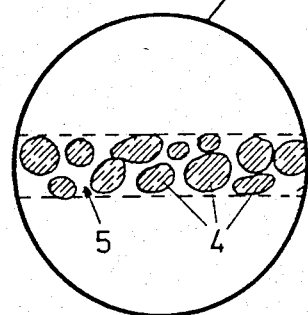
FIG. 1b is a view, on a greater scale, of the fluorescent line.

As will more specially be seen from FIG. 1b, the pseudo one-dimensional line 3 is formed by a random distribution of coarse grained fluorescent pigments 4 with the outcome that the credit card has its own unique random information.

If, in this connection, the line 3 is lighted up with light of a wavelength responsible for strong fluorescent radiation from the fluorescent pigments but not, however, from the spaces 5 between the pigments, a signal will be produced in a receiver which is dependent on the random distribution of the pigments, the signal being unique to each such credit card. The changing of the radiation into an electrical test signal is, in this respect, undertaken using a light sensing unit placed in the receiver.

To make certain that a credit card, even on testing a number of times in the same or different testers, will, in all cases, be responsible for producing the same test or identification signals, the receiver has a narrow slot diaphragm 6, see FIG. 1a, whose slot length "a" is very much greater than the breadth of the fluorescent line and the sum of all possible tolerances together, which are the outcome of producing and transporting the card. For this reason, it is possible to make certain that, even if the line is, in a sideways direction, some distance out of the desired position (see double arrow 7), the test signal of the card is still true and, for this reason, such an out-of-line position of the line is not responsible for the outcome of measuring being different each time measuring is undertaken, that is to say measuring is reproducible.

Figure 2A:
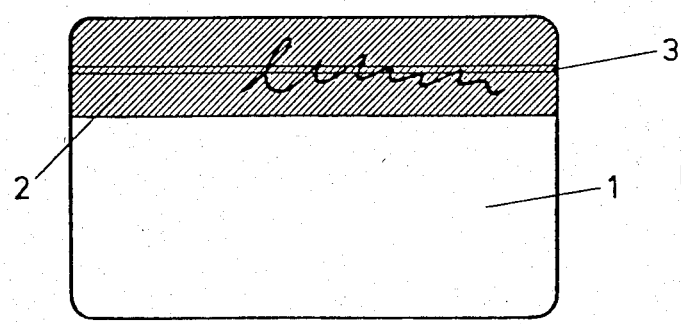
FIGS. 2a and 2b are views of a credit card with a fluorescent line on the signing stripe.
Figure 2B:
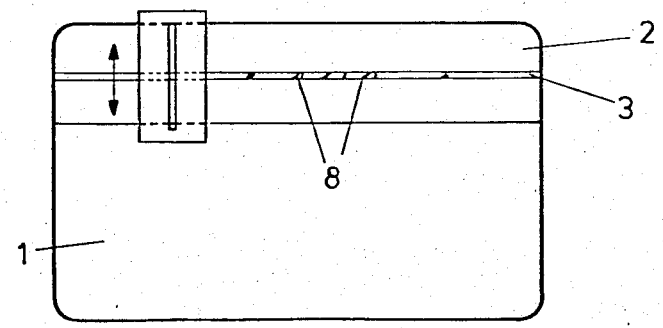

As will be seen from a further working example of the invention, to be seen in FIGS. 2a and 2b, the fluorescent line 3 may furthermore be placed at the signing line or stripe 2. As will be seen, the fluorescent line 3 is so placed parallel to the long-edge of the credit card 1, that on signing later, the signed name will necessarily be over the line.

If, in this case as well, the signing line is acted upon by light with a wavelength, responsible for causing strong fluorescence of the line partly covered by the signed name (in which case, however, the signing line and furthermore the signed name itself, are not fluorescent), in a receiver only the line 3 will be seen as a clearly brighter, fluorescent line, which however is darker at the positions at which it is covered by the signed name. If, for this reason, the credit card is moved through a receiver, a signal with an unchanging level will be produced by it in the bright parts of the fluorescent line with signal cut-off at the positions covered by the signed name (see FIG. 2b). The cut-offs 8 of the fluorescent line may, in this respect, be changed into unique test signals and then processed in any desired way later.

Because every signed name, even if it is signed by the same person, will be different in the relations between its line parts and furthermore with respect to the position on the signing line, it is possible to say, for the present purpose, certainly that different credit cards will have different test signals. For this reason, on signing over the fluorescent line, a random property, unique to the card in question, will be produced by the card owner or user himself, after the card has been produced and it will furthermore be possible to say that, certainly enough, there is no second credit card in existence with the same random information.

If the fluorescent line is, as noted at the start, formed in this case as well by a random distribution of coarse grained fluorescent pigments, a further random property will be produced, which furthermore comes to be part of the test signal modulated by the signed name.

Although the working examples of the invention of FIGS. 1 to 2 take the form of a simple system, it will readily be clear that even in these cases the test signals may be changed by a number of different effects acting on them.

For example by selection of the fluorescent dyestuff the spectrum range to be processed may be so designed that it is responsible for the best possible signals (with respect to being in line with the sensitivity curves of the light-sensing parts) in the receiving unit while, however, the fluorescent dye makes it specially hard for strangers or onlookers to get knowledge of the identification signals (for example because of flourescence outside the visible part of the spectrum).

In addition to the grain-form of the fluorescent pigments, a further important effect is that produced by the nature of the ink used for signing. If the absorption of the ink is strong in the absorption or emission wavelength of the fluorescent material, the test signal will be heavily modulated and may be sensed with generally simple apparatus, but, however, in a more certain way for this reason.

Because such a simple system makes the work of a forger simpler as well, the system may, be so designed that the modulation in the reading range is of a low level. The level may be so low that the test signal, because of a very small signal-to-noise amplitude is only detected after repeated scanning of the track or by scanning the track with a multiple channel detector, on a single run and evaluation of the superimposed signal.

Furthermore by having a certain design of the receiving apparatus, for example by use of filter systems, it is possible to make certain that only a certain part of the input radiation is processed, something which is more specially interesting in the case of mixed fluorescence.

A further important effect is produced by the positioning of the fluorescent line on the card. If, for example, with the help of marks, the signed name of the card user is fixed in a desired position, by positioning the fluorescent line on the name stripe, it is possible to make certain, within narrow limits, that the line is covered by the middle part of the name or by the top and bottom strokes of the name. Because in the middle part of the signed name the number of upright parts of the signed name, as is to be seen from experience, is greater than at the edges, it will be likely that at this position there will be a greater number of signal pulses, that is to say of cut-offs in the fluorescent line.

Lastly all important effects may be changed further by a desired selection of the exciting spectrum within certain range.

Figure 3:
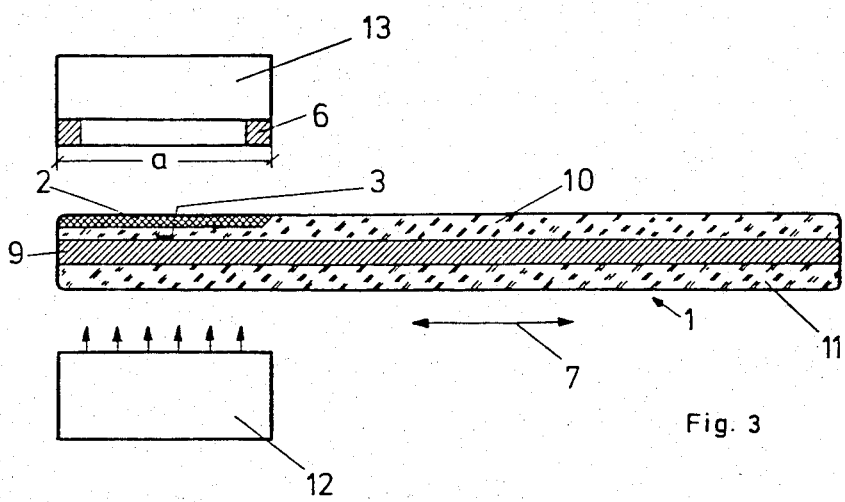
FIG. 3 is a view diagrammatic section through a credit card with a testing unit.

In FIG. 3 is a very diagrammatic section of a credit card 1 is to be seen, making clear the layer-by-layer structure of the card. The credit card of FIG. 3 is made up of a name stripe 2, a middle paper layer or core 9, on whose two sides information is printed, and upper and lower transparent facing layers 10 and 11, stopping any damage to the information on the middle paper layer and the fluorescent line 3, placed in this example of the invention within the structure of the card, and stopping any outside effects and any attempt at forging or making changes without authority. The middle, information layer 9 of the credit card has been printed on using the sides covered by the glass-clear foils 10 and 11. Because the two sides have been processed in separate printing operations, the print on the two sides of the card will never be completely in line with each other, although keeping to certain tolerances. Seen by transmitted light, the pattern produced by the upper print on top of the lower print will be different from card to card, something which may furthermore be used for producing a unique test signal.

If the card is not tested (noted at the start), in reflected but in transmittedlight, on the one hand the exciting light going through the card to the fluorescent line, and coming from a light producer 12 and on the other hand the light emitted from the line 3 and coming to a receiver 13 will be absorbed or dispersed dependent on the partial transparency of the separate layers. For this reason the test signal form will be dependent not only on the absorption of the fluorescence emission, for example because of the properties of the signed name stripe 2, but furthermore on a random modulation, which, however, may be truly measured in the case of each card, of the exciting light, for example because of the printing on the two sides of the inner paper layer 9 or because of the cloud effects of the paper when viewed by transmitted light.

If the paper for making the core of the card is watermarked, the test signal will be further modulated by the partially increased or decreased transmission of the paper.

Furthermore a system of parallel lines within the core and produced by printing will lastly be responsible for producing a mixing of the test signal with a clock signal, this not being able to be seen from the outside, which furthermore is of help in processing the identification signal.

As is to be seen very diagrammatically in FIG. 3, between the receiver 13 and the card 1, the slot diaphragm 6 is placed. In this respect, as will be made clear later, the same effect is produced if the diaphram 6 is right up against the card 1, near the receiver 13 or near the light producer 12. In fact, the important point is that the sensitivity of the measuring system is of the same unchanging level along the length a of the diaphagm 6, because in this case motion of the card 1 normal to the transport direction, as is made clear by the double arrow 7, does not make the measuring operation any less true, that is to say the outcome is the same in all cases reproducible. In the account now to be given, using FIGS. 4 to 7, some forms of testing apparatus, used in the teaching of FIG. 3, will be given attention.

Figures 4, 5:
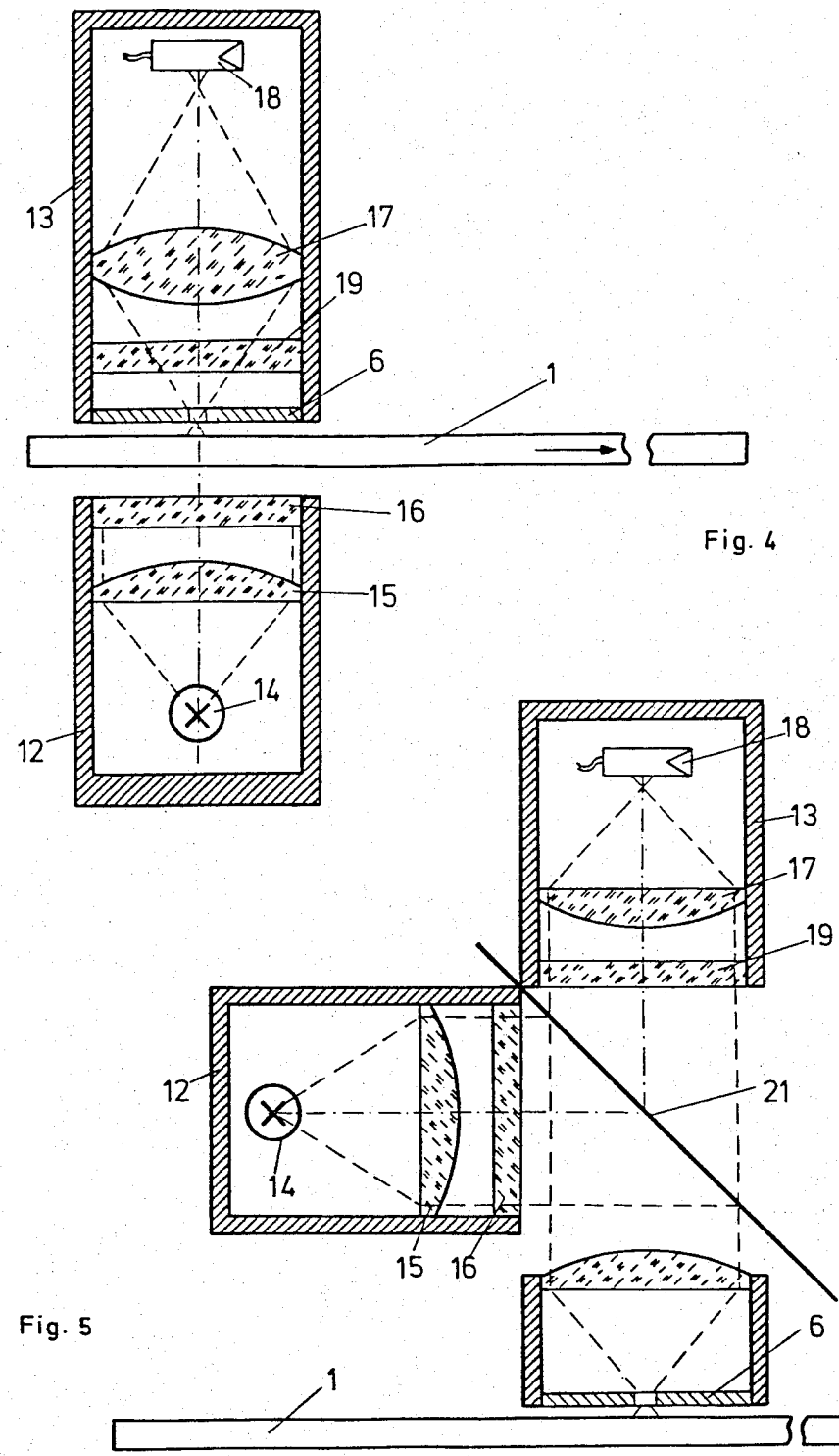
FIG. 4 is a view of a testing apparatus touching the card on the line for measuring with transmitted light.
FIG. 5 is a view of a testing apparatus touching the card on the line for measuring with reflected light.

Firstly, in FIGS. 4 and 5, two forms of testing apparatus are presented, in which the diaphragm 6 is right up against the credit card 1.

In FIG. 4 testing takes place in transmitted light. Using a light producer 14 of the necessary design the fluorescent line within the body of the card 1 (and not to be seen in the figure) undergoes excitation. In this respect a lens 15 is responsible for even lighting up of parts of the card near the fluorescent line. A filter 16, placed between the card 1 and the light producer 14, lets the exciting light through completely while stopping the light emitted by the fluorescent line.

The emitted light of the fluorescent line now goes by way of the slot of the diaphram 6 to a lens 17 forming an image of the slot on a photo-electric unit 18 used for changing the light coming to it into an electrical signal.

Furthermore a filter 19 is placed in the emission ray line for stopping, in this case, the excitation light.

A testing apparatus using reflected light is to be seen in FIG. 5. In this case the exciting light again goes through lenses refracting it and goes to a half-transparent mirror 21 and then on to the important part of the credit card 1. The emitted light then goes through the half-transparent mirror and is processed in the same way as was noted earlier.

In the two testing processes it is a question of measuring operations in which the card is touched, because the diaphragm 6, for reasons of forming the desired image, is placed as near as possible to the thing to be measured, that is to say the card, with the outcome that the card has to be touched. This shortcoming may be put to an end by the diaphragm 6 being placed in the focal plane of one of the lenses without there being any touching. In this respect it is possible for the diaphragm to be placed in the way of the exciting light or of the emitted light.

Figure 6:
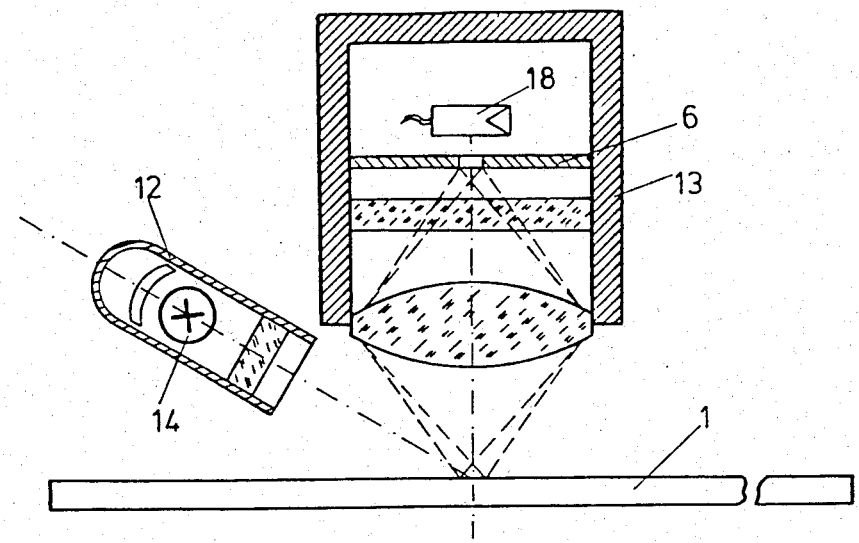
FIG. 6 is a view of a testing apparatus in which the card is not touched, reflected light being used.

To this end a testing apparatus is to be seen in FIG. 6, working on the reflected light teaching, and in the case of which the diaphragm 6 is placed in the way of the ray coming from the receiver 13 right up in front of the photo-electric unit 18.

Figure 7:
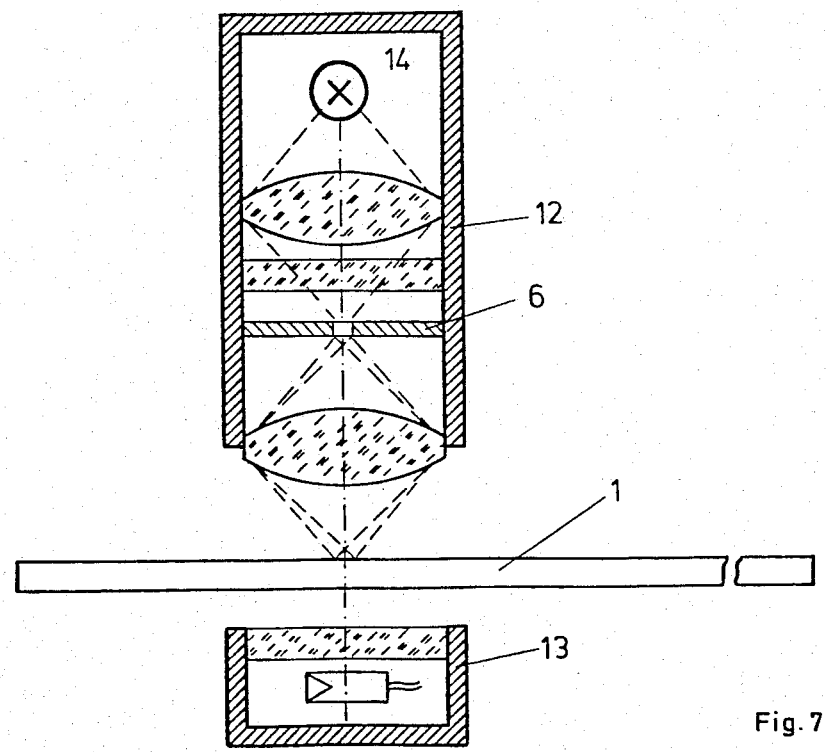
FIG. 7 is a view of a testing apparatus in which the card is not touched, transmitted light being used.

On the other hand in FIG. 7, a test apparatus is to be seen using transmitted light and in the case of which the diaphragm 6 is placed in the way of the ray from the light producer 12. The other parts of the two test apparatuses in question are the same as in the forms of apparatus to be seen in FIGS. 4 and 5.

Furthermore it is not completely necessary for the diaphragm function to be produced by a diaphragm itself. It is furthermore possible for the outline of the light receiving face of the photo-electric unit or for the lamp filament to be responsible for the function of a diaphragm.

As has been noted earlier on in the present account, it is equally important for all testing processes for the fluorescent line to be made as narrow as possible so that, in connection with the diaphragm opening which is as well very narrow and is normal to the fluorescent line, at the point of crossing over an almost point-like sensing or scanning of the fluorescent line is able to take place. Because of this nearly pointlike sensing, in the case of which the acting parts, as for example the different lines in the signed name, are responsible for complete cut off of the measuring point, a very heavily modulated signal is produced.

Taking a general view, it is possible to say that for producing a unique property, able to be truly measured or tested, that is to say repoducibly tested, on one of the inner or outer limiting faces of the credit card present, a very narrow (pseudo one-dimensional) line or strip is to be used which is very markedly different to the parts near it, that is to say having a high contrast, in the case of which the property to be tested is modulated by at least one random function.

The unique nature of the card becomes greater with an increase in the number of random generators used for forming the random function. Random generators which may be used are for example:
  a. unregular printing (for example produced by the use of coarse-grained fluorescent pigment)
  b. different absorption and/or reflexion in different planes of the card produced for example by:
     the signed name,
     high-speed printing of the owner's name (it possibly being printed a second time near the single name stripe),
     further underprinting on the core under the signed name stripe on the front side,
     print on the back side of the paper core,
     print on an inner layer of the paper, and
     material within the substance of the paper,
  c. different light dispersion by the paper because of cloud effects and water-marks
  d. production tolerances on putting the different layers together.

As will be seen from the general account of the invention it is certainly not necessary for the pseudo one-dimensional line responsible for the random function to take the form of a fluorescent line able to be optically sensed. Because the most important need is one of contrast with respect to nearby parts of the card and, for this reason, it is important for the random function to be sensed or measured, the line may certainly have properties which are electrically or magnetically sensed and which are modulated by the necessary random generators.

I claim:

1. A security document such as a credit or identification card comprising means for modulating passage of energy in waveform through at least a portion of said document; the modulating means being randomly distributed in said portion of said document; said document further comprising means for emitting, transmitting or reflecting wave energy arranged along a line; said wave energy emission, transmissions or reflections being detectable along said line from the card exterior and through the modulating means for providing reproducible signals; said line being of such width and said modulating means random distribution being such that successive detections of energy emissions, transmissions or reflections along the length of said line result in a reproducible, modulated signal which is unique to the line and document with which associated.

2. A security document as in claim 1 in which the modulating means are light absorbing and/or light dispersing structures in one or more planes of the security document.

3. A security document as in claim 2, in which the modulating means are formed by the cloudy formation and/or watermark of a paper layer of the document.

4. A security document as in claim 2, in which the modulating means are formed by the position and shape of a signature interrupting the track.

5. A security document as in claim 2, in which the modulating means are formed by the position and shape of one or more printed patterns on one or more layers of the document.

6. The security document as in claim 2 in which the modulating means are embedments in one or more planes of the security document.

7. A security document as in claim 3 or 5 in which the modulating means comprise structural document differences formed within the manufacturing tolerances of the security document.

8. A security document as recited in claim 1 in which the means arranged in the line-like track comprise randomly distributed fluorescent particles which vary in size and in their distance from each other.

* * * * *